United States Patent [19]

Millward

[11] Patent Number: 5,557,340
[45] Date of Patent: Sep. 17, 1996

[54] NOISE REDUCTION IN VIDEO SIGNALS

[75] Inventor: John D. Millward, Hitchin, United Kingdom

[73] Assignee: Rank Cintel Limited, United Kingdom

[21] Appl. No.: 345,545

[22] Filed: Nov. 28, 1994

Related U.S. Application Data

[63] Continuation of Ser. No. 806,665, Dec. 13, 1991, abandoned.

[30] Foreign Application Priority Data

Dec. 13, 1990 [GB] United Kingdom ............... 9027080

[51] Int. Cl.⁶ ......................................... H04N 9/64
[52] U.S. Cl. .................. 348/627; 348/630; 348/631
[58] Field of Search .................... 348/627, 630, 348/631

[56] References Cited

U.S. PATENT DOCUMENTS

| | | | |
|---|---|---|---|
| 3,340,356 | 11/1963 | James | 358/37 |
| 3,681,520 | 8/1972 | Schneider | 358/37 |
| 3,729,580 | 4/1973 | Schneider | 358/37 |
| 4,074,308 | 2/1978 | Gibson | 348/627 |
| 4,223,339 | 9/1980 | Lagoni | 348/627 |
| 4,245,237 | 1/1981 | Lagoni | 358/31 |
| 4,263,616 | 4/1981 | Lee | 348/627 |
| 4,536,796 | 8/1985 | Harlan | 348/627 |
| 4,812,905 | 3/1989 | Rossi | 358/32 |
| 5,032,909 | 7/1991 | Sato | 348/627 |

FOREIGN PATENT DOCUMENTS

| | | |
|---|---|---|
| 0167387 | 7/1985 | European Pat. Off. . |
| 0267785 | 11/1987 | European Pat. Off. . |
| 0382100 | 2/1990 | European Pat. Off. . |
| 0240282 | 11/1985 | Japan ........................ 358/32 |
| 1033413 | 7/1962 | United Kingdom ............ 358/32 |
| 1080535 | 9/1964 | United Kingdom . |
| 2009557 | 11/1978 | United Kingdom . |
| 2113945 | 10/1982 | United Kingdom . |
| 2209447 | 3/1988 | United Kingdom . |
| 2210531 | 9/1988 | United Kingdom . |

OTHER PUBLICATIONS

"Improved Signal Processing Techniques for Color Television Broadcasting", McMann, pp. 221–228, 1968.
Rank Cintel, "Vertical Aperture Corrector", Cat. No. 417–366, Handbook No. C430.

Primary Examiner—Curtis Kuntz
Assistant Examiner—Minsun Oh
Attorney, Agent, or Firm—Ostrolenk, Faber, Gerb & Soffen, LLP

[57] ABSTRACT

In a high definition flying spot telecine, noise from photomultiplier tubes and afterglow correctors reaches unacceptable levels at high frequencies. The circuit illustrated applied a conventional gamma correction to low frequency components (at 32) but applies a non-linear characteristic to the high frequency components (at 36). The characteristic is chosen to provide the optimum noise performance for positive or negative film. The two parts of the signal are then recombined by adders 40. High frequency processing is carried out on a multiplex of the R, G and B components to reduce complexity (at 16).

20 Claims, 7 Drawing Sheets

NOISE REDUCTION IN VIDEO SIGNALS

This is a continuation of application Ser. No. 07/806,665, filed on Dec. 13, 1991, now abandoned.

BACKGROUND OF THE INVENTION

This invention relates to methods and apparatus for reducing noise in video signals. It is especially, but not soley, applicable to video signals obtained from photographic or cinematographic film for example in a flying spot or photoconductive telecine, particularly when aperture correction is employed. It is particularly, but not solely, applicable to a high definition telecine, where the noise is higher and more aperture correction is usually required.

To appreciate the background behind telecines aperture correction and noise reduction, it is useful to consider photoconductive telecine. These telecines use a photoconductive camera where the major source of noise is the head amplifier. This noise source is constant at all levels of amplitude at the amplifier output. In the camera circuitry, the output of the head amplifier forms the input to the gamma corrector which corrects the signal to compensate for the receiver CRT characteristic. The gamma corrector has a nominal power law of 0.4 which results in a higher differential gain at black level as compared to white level. This causes a particular problem as it has the effect of amplifying noise in the signal to a greater extent at black level than white level. Unfortunately, the human eye is more sensitive to noise in black areas than whites.

Photoconductive cameras conventionally use aperture correction to compensate for various losses. Aperture correction increases high frequencies to compensate for fine detail contrast reduction caused by the finite size of electron spots. Without aperture correction applied, the noise level in a gamma corrected signal is not normally significant. However, after aperture correction the noise at black usually becomes observable. As a result, it is very common practice to reduce or eliminate aperture correction as the signal level approaches black, and this practice is called "level dependant aperture correction". Two examples of "level dependant aperture correction" are shown in FIGS. 1 and 2, the only difference between the two systems being whether the aperture correction is applied before or after gamma correction. Level dependant aperture correction has the effect of reducing the resolution in the blacks, but it has been found that the human eye is less likely to detect the loss of resolution than the noise.

The major noise source in a flying spot telecine is the photomultiplier. Noise amplitude is proportional to the square root of the light input and is therefore zero at black. After gamma correction the noise is approximately constant over the signal range and it is not normally necessary to apply level dependant aperture correction.

This situation is no longer true when negative film is used. Then, the gamma corrector has a power law of −0.8 and the noise distribution is no longer uniform but of much greater amplitude in the whites. The level of noise is barely acceptable in present television systems and will certainly not be acceptable with HDTV systems.

The difference in noise levels between telecines operating with positive and negative films may be better appreciated from the following examples:

The signal to noise ratio in a flying spot telecine is usually only measured in the positive mode at a signal level equivalent to a scene brightness of one tenth of the peak brightness, at a gamma of 0.4. A typical good figure obtained in practice is 50 db where 40 db is near the acceptable limit.

Using the 50 db figure as a basis, the signal to noise figures at peak brightness, one tenth peak, and one hundredth peak for positive film are:—52 db, 50 db, and 48 db respectively to the nearest db.

For negative films, at a gamma of −0.8 and allowing for the loss of light due to the orange mask in the green channel, the figures obtained are 31 db, 44 db and 57 db respectively. Thus, there is clearly a wide variation in signal to noise from black to white. A gamma of −0.8 in the telecine is necessary for negative films so that the viewer of a TV receiver perceives a picture with the same brightness graduation as the original scene, and the orange mask in negative films is used to aid printing from negative films.

We have appreciated that the gamma characteristic in the telecine can have a marked effect on the signal to noise ratios, the noise normally being in the upper frequency band due to aperture correction. We have also appreciated that the correct gamma characteristic must be applied in the telecine or camera to reproduce the correct brightness graduation, but this correct characteristic need only apply to the low frequency components of the signal. Therefore, in accordance with one aspect of the invention, the high frequency components of the signal could be processed with a different gamma and indeed it is not necessary to employ a perfect gamma curve but rather it is possible to use the most appropriate non-linear characteristic that produces the greatest reduction of noise.

SUMMARY OF THE INVENTION

The invention is defined in the claims, to which reference should now be made.

Four different embodiments of the above technique will be described. The first, because of its simplicity, could be used to modify existing telecines or cameras. The second overcomes a disadvantage of the first, and the third produces an improvement in signal to noise ratios in telecines where no aperture correction is applied.

The first three embodiments apply to signal source equipments, such as cameras and telecines, where gamma correction is a necessary part of the processing.

The fourth embodiment is for general application to any video signal, usually separate from any source equipment, where there is no need for gamma correction.

The technique is suited to such situations where the noise is mainly high frequency.

The fourth embodiment of the invention is also applicable where a video signal is received from a source, not necessarily a telecine, at an acceptable resolution, but where the noise is unacceptable at certain grey levels. The invention allows the noise to be redistributed more evenly over the grey scale. Where the noise is reasonably uniform over the grey scale, the third and fourth embodiments could be applied to redistribute the noise so that it is no longer uniform, for example to regions of the grey scale where the human eye is less capable of seeing noise.

BRIEF DESCRIPTION OF THE DRAWINGS

Four embodiments of the invention will now be described, by way of example, and with reference to the accompanying drawings in which.

DETAILED DESCRIPTION

Figure 1:
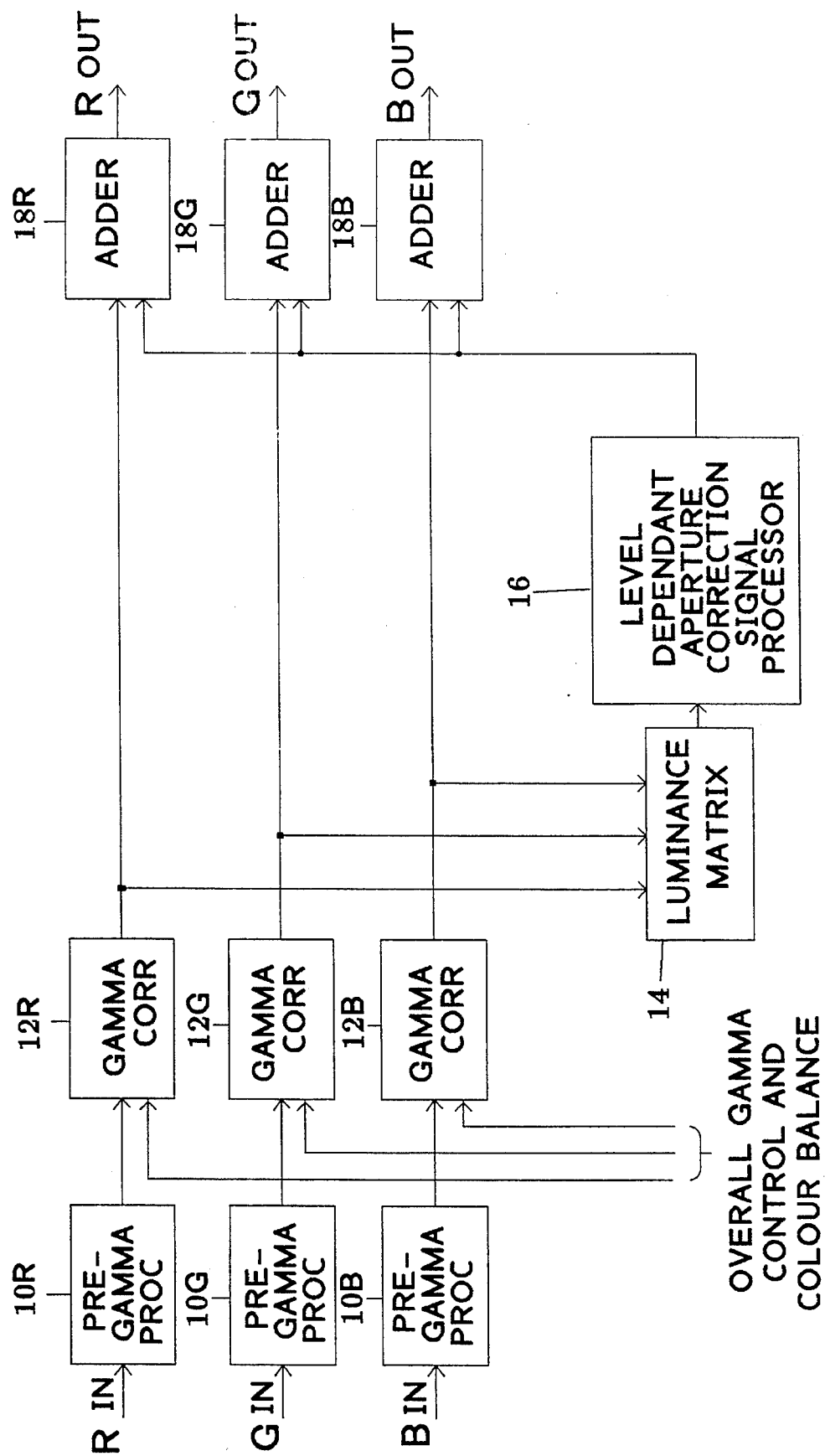
FIG. 1 shows, in block form, one implementation of a known level dependant aperture correction circuit already described.
Figure 2:
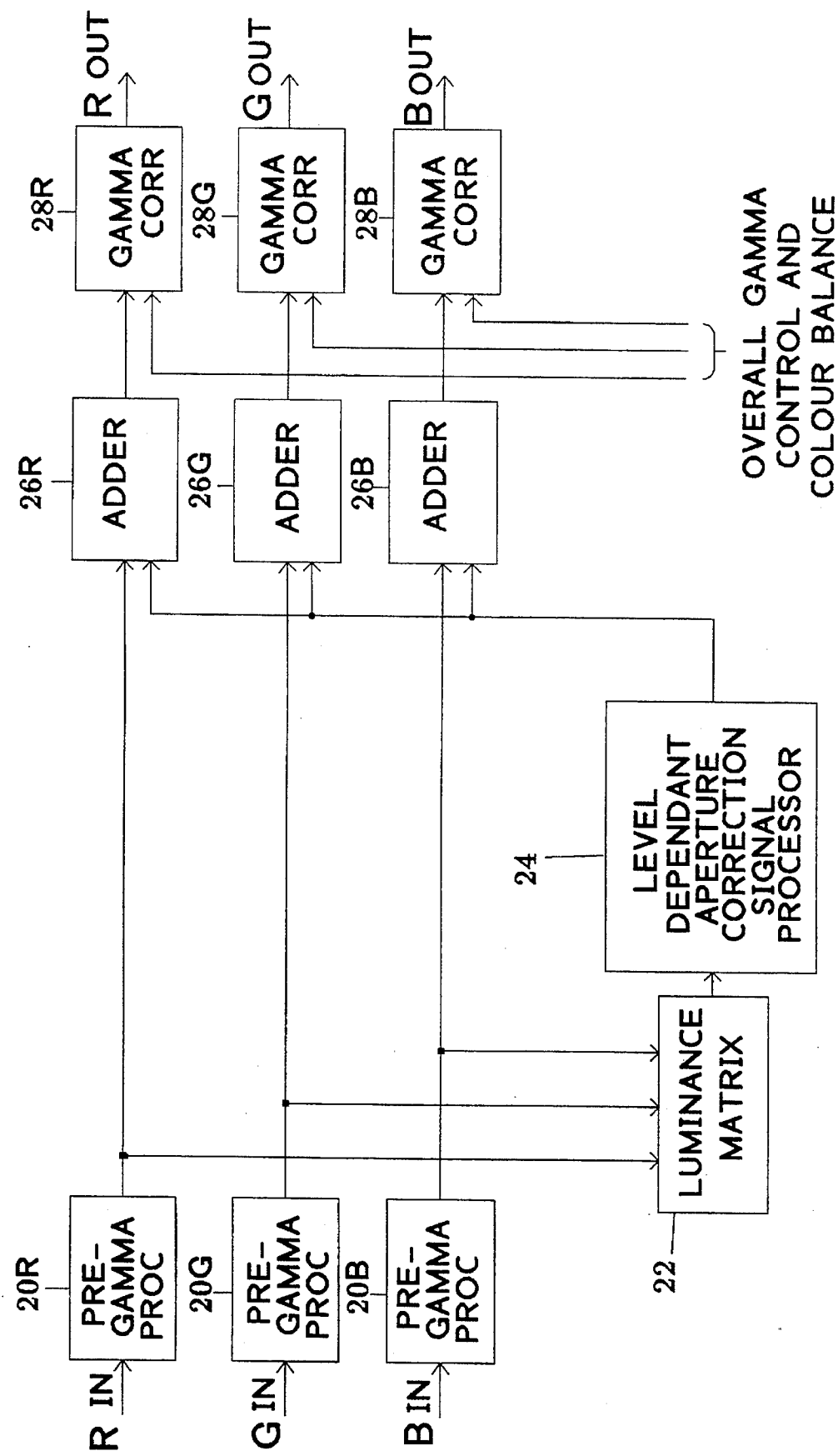
FIG. 2 shows, in block form, an alternative implementation of the circuit of FIG. 1 already described.
Figure 3:
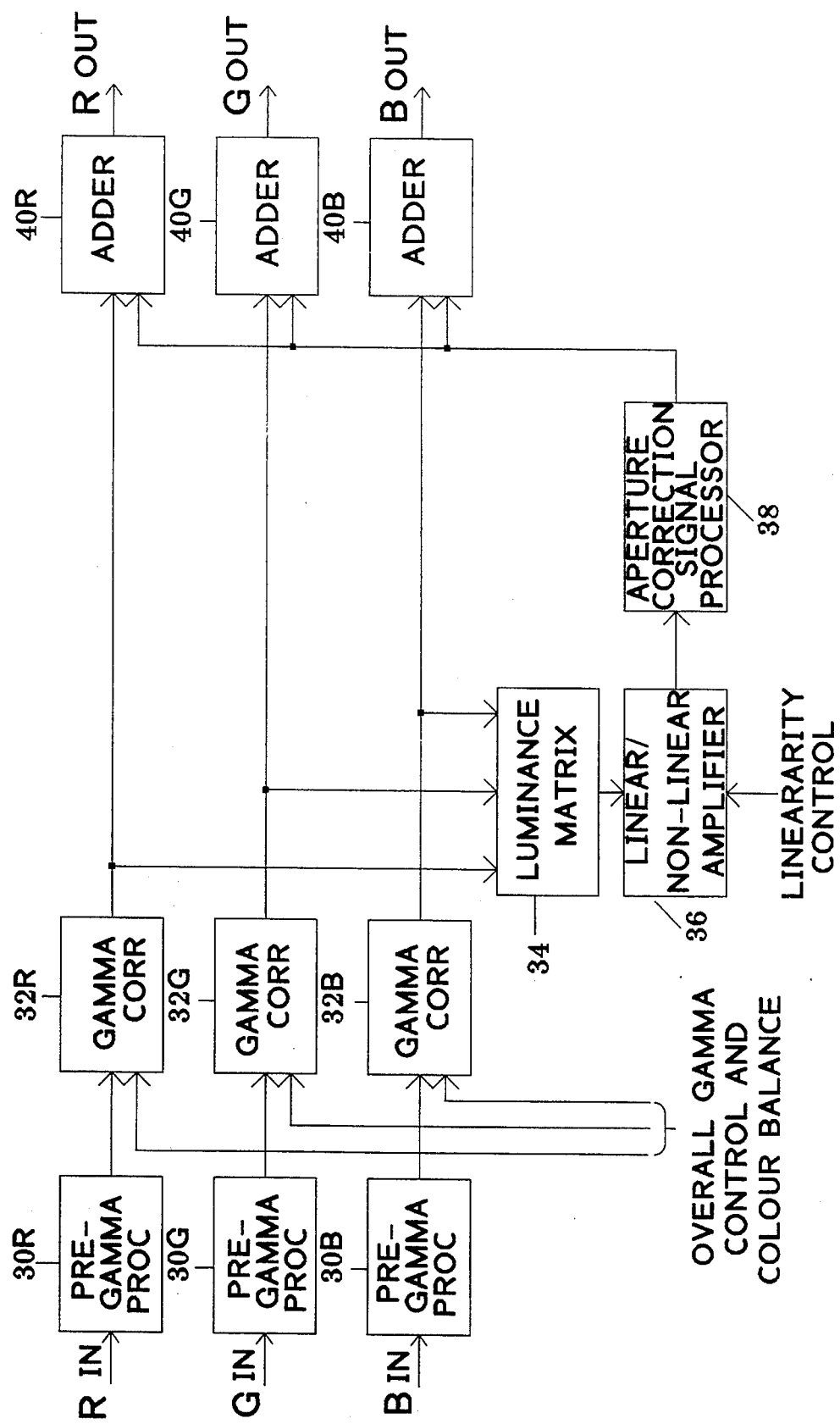
FIG. 3 shows, in block form, the first embodiment of the invention.

Referring to FIG. 3, the first embodiment of the invention, there are three main signal paths for red, green and blue, comprising blocks 30, 32, and 40. The fourth path for aperture correction comprises blocks 34, 36, and 38.

The three main colour paths are identical and therefore we need only describe the green path. The pre-gamma processing, 30G, is intended to cover all the processing prior to the gamma corrector from the incoming green light signal input to the gamma corrector. The necessary processing differs considerably between flying spot and photoconductive telecines and will not be described here since it does not affect the principle of the invention.

The purpose of the adder, 40G, is to combine the aperture correction signal with the main green signal.

The aperture correction path consists of only one channel for economy and performance reasons. Ideally, each colour channel would have its own aperture correction channel, particularly if all three channels had similar signal to noise ratios. In practice, the green channel normally has the best signal to noise ratio and therefore instead of using three separate aperture correction channels, it is normal practice to employ either green or luminance to generate the aperture correction signal in a single channel, and the aperture correction signal generated is then added back to all three channels.

The principle of the invention is not affected by the number of aperture correction channels used or of which colour.

The luminance matrix, 34, sums the red, green and blue signals in the proportions 30%, 59% and 11% respectively, which also equals the human eye sensitivity to these colours.

The luminance signal is then connected to the linear/non-linear amplifier, 36. The transfer characteristic of this amplifier is chosen to provide the optimum displayed image with regard to noise and resolution, and therefore must be controllable.

Figure 7:
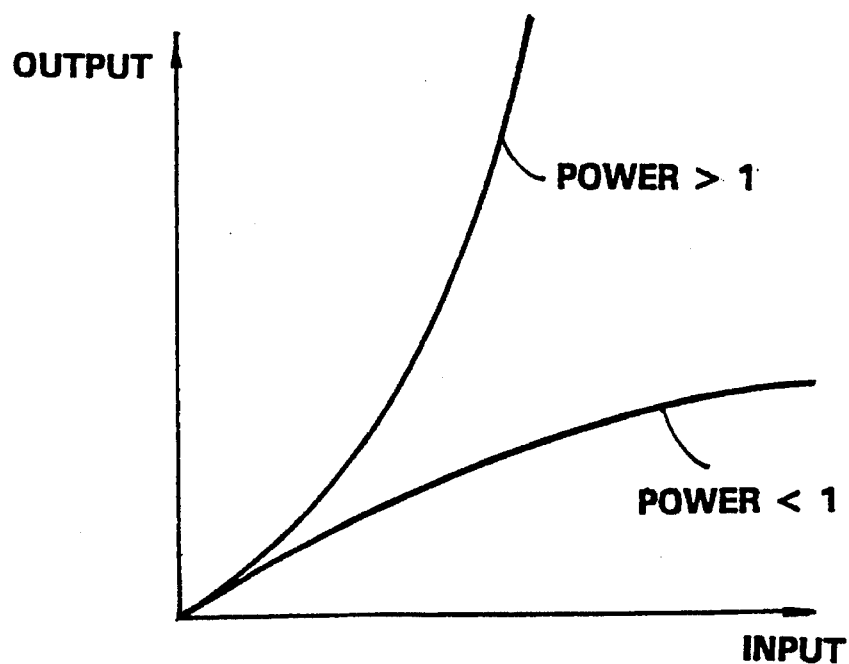
FIG. 7 shows a power law curve.
Figure 8:
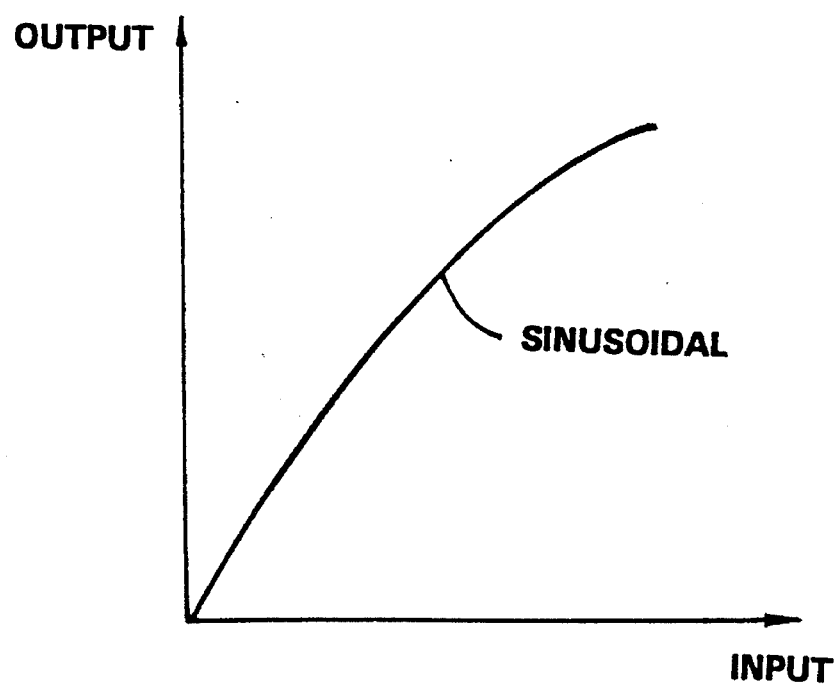
FIG. 8 shows a sinusoidal curve.

For example, when operating a telecine with positive film with good signal to noise ratio, the characteristic of amplifier 36 could be linear, but if negative film was being used, the amplifier 36 would preferably be non-linear since as explained previously, the noise amplitude is much higher near peak white, therefore we would choose a non-linear characteristic with lower differential gain towards peak white. For example, the amplifier may apply a power law of less than unity, see FIG. 7, or a sine law characteristic, see FIG. 8, where the differential gain is fairly uniform from black through grey, but drops rapidly as it approaches peak white.

The linearity control of amplifier 36 can be remoted with very fast changes so that in a practical system, the film whether it be positive or negative or a combination of both spliced together, can be previewed, and the optimum characterisic required in the amplifier 36 for each film scene can be stored, together with the scene frame numbers. On playback, the optimum characteristic, would be retrieved from the store automatically, scene by scene, to ensure the best possible performance throughout the film.

After leaving block 36, the signal passes to the aperture correction signal processor 38, which uses standard techniques to generate the high frequency components, to improve the resolution. This signal is then added to the three colours through blocks 40.

Although this first embodiment is the simplest to implement on existing equipment, one disadvantage is that the luminance matrix 34, derives its signal from the main paths after gamma correction, and it is normal to colour balance the film by adjusting the gamma correctors. Therefore, there will be interaction between the setting of the gamma correctors and the setting of the linear/nonlinear amplifier 36, with regard to the optimum setting of 36. Therefore, the second embodiment is intended to remove this problem.

Figure 4:
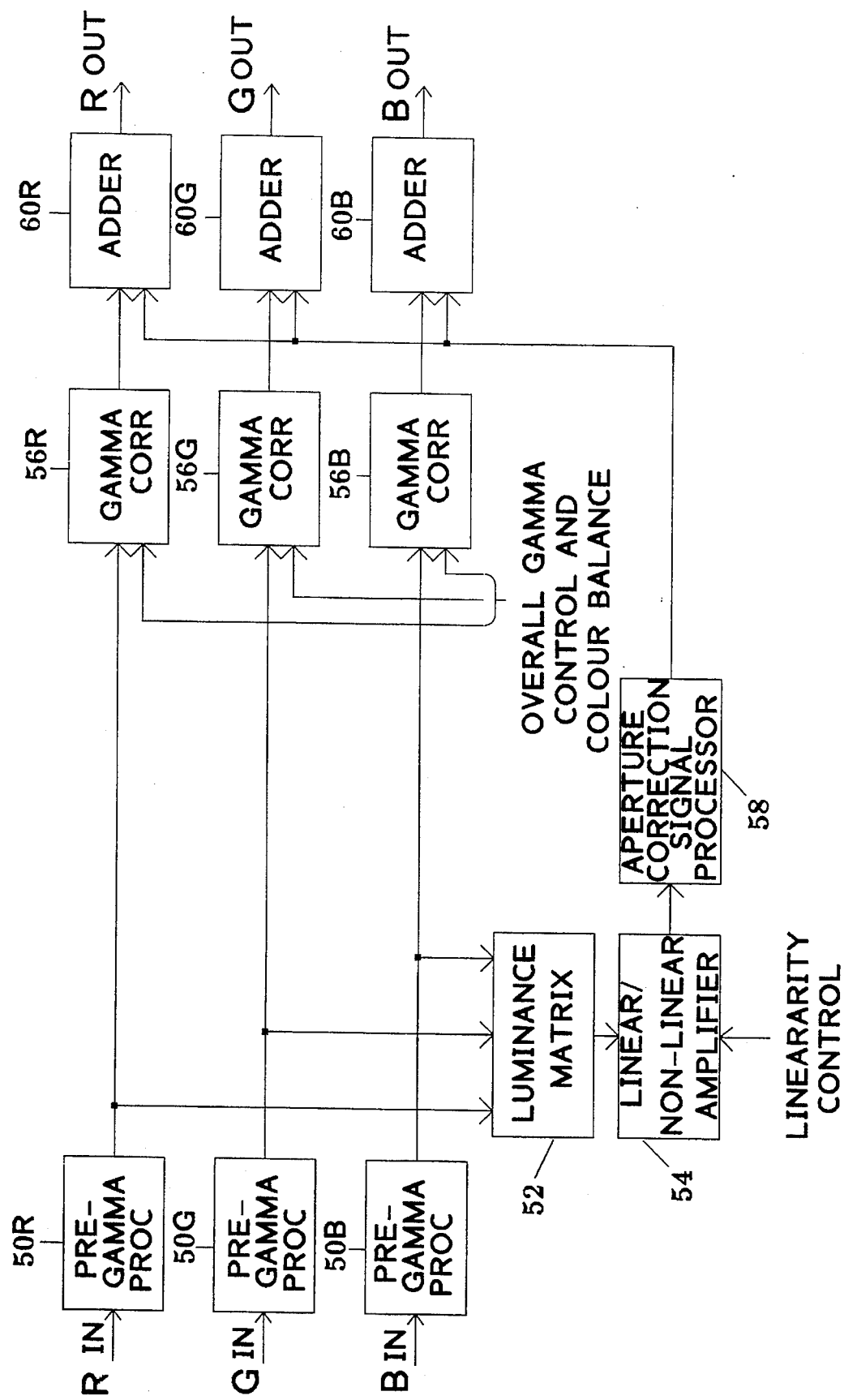
FIG. 4 shows, in block form, the second embodiment of the invention.

The second embodiment is shown in FIG. 4, and the only difference from the first embodiment in FIG. 3, is that the luminance matrix 52, obtains its red, green and blue inputs from the main path prior to the gamma correctors. This means that colour balancing in the main path, does not affect the aperture correction path, and there is no longer any interaction.

The linear/non-linear amplifier 54, will require a different characteristic to non-linear amplifier 36 in FIG. 3, since it receives linear signals instead of gamma corrected signals.

Summarising, the second embodiment of FIG. 4, will have all the operational advantages of the first embodiment in FIG. 3, without the interaction between the setting of the gamma correctors and the non-linear amplifier.

Before proceeding to the third embodiment, it is worth noting that in the first and second embodiments, with the aperture correction path set for zero gain, or no aperture correction, there will be no improvement in the noise performance for positive or negative film. This is because all the noise in the output signals has been transmitted via the main path channels and not via the non-linear amplifier in the aperture correction path. Therefore the third embodiment was derived to reduce noise when no aperture correction is required.

Figure 5:
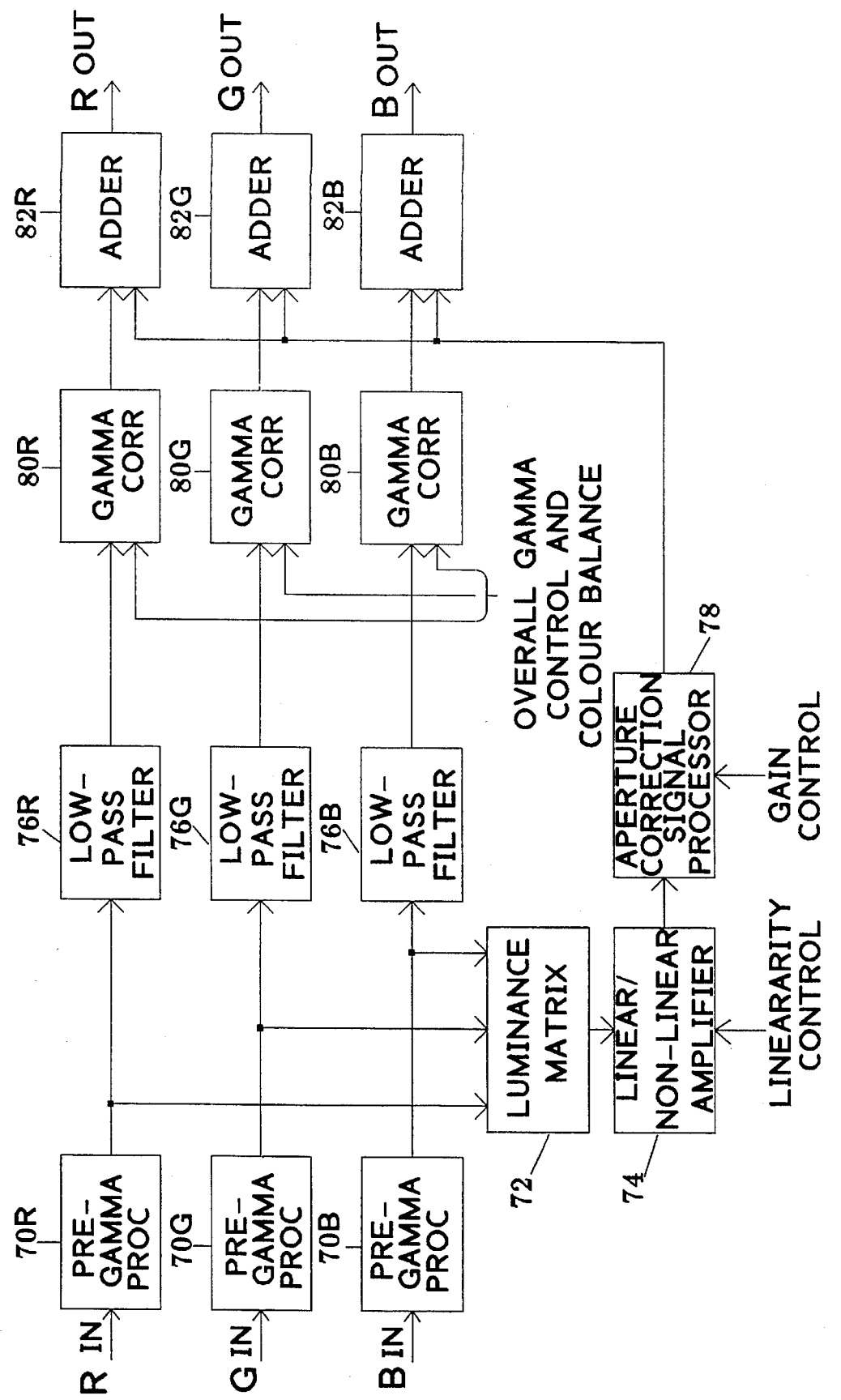
FIG. 5 shows, in block form, the third embodiment of the invention.

The third embodiment is shown in FIG. 5, and the only change from the second embodiment of FIG. 4, is the addition of the low pass filters 76, in the three colour channels.

In this embodiment, the aperture correction signal processor 78, would preferably have a frequency response characteristic which was complementary to the low pass filters 76, so that when the linear/non-linear amplifier 74 has the same characteristic as the gamma correctors 80, the overall frequency response would be constant from input to output.

Therefore, we now have the situation, where with a construct frequency response, and no aperture correction, the high frequency components of the video signal are routed via the aperture correction path, where there exists a controllable linear/non-linear amplifier 74. By adjusting the characteristic of the amplifier 74, it is possible to redistribute the noise characteristic over the grey scale to obtain the optimum picture quality with regard to noise.

If aperture correction is required, then the gain of the aperture correction signal processor 78, can be increased, so that the overall response from input to output is rising with frequency.

As mentioned before, the linearity control values and aperture correction signal processor gain values, can be stored with film frame numbers, and automatically retrieved on playback.

Figure 6:
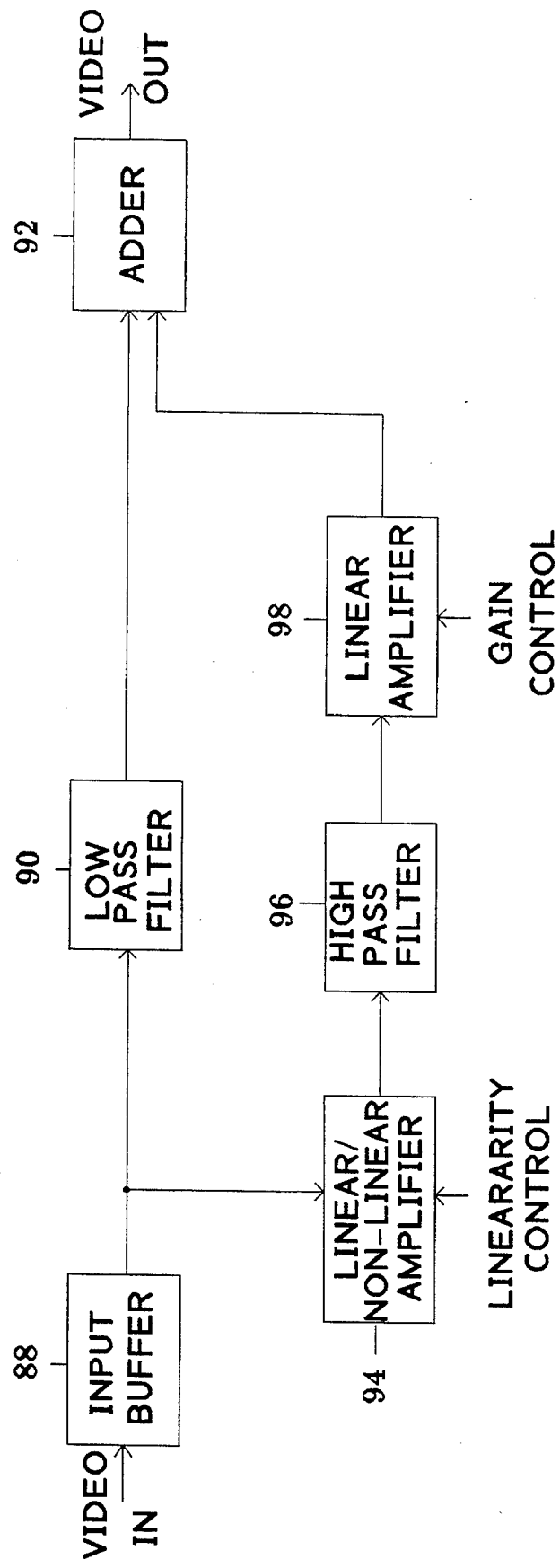
FIG. 6 shows, in block form, the fourth embodiment of the invention.

The fourth embodiment is shown in FIG. 6, and since it is for general application to video signals, only one channel is shown, but any number of channels could be used.

From the input buffer 88, we have two paths for the video signal to follow. One is via the low pass filter 90 to the adder 92, and the second path is via the linear/non-linear amplifier 94, the high pass filter 96, and the linear amplifier 98, to the adder 92.

If 94 and 98 were both linear with unity gain, and the high pass filter 96 was complementary to the low pass filter 90, then the output signal would be the same as the input.

The distribution of noise over the video grey scale can be varied by adjustment of the linear/non-linear amplifier 94, whilst maintaining a constant frequency response. Also, if required or if necessary, the frequency response can be varied by adjustment of the gain of amplifier 98.

Thus, the invention in its various embodiments, provides methods and apparatus in which noise can be reduced or redistributed in the video grey scale, especially where the video signals are generated from photographic film. The embodiments described are applicable to any video signal and allow correction whether or not aperture correction is performed.

I claim:

1. A method of reducing noise in a video signal, comprising the steps of:
    a) deriving a luminance signal from said video signal and supplying said luminance signal to a first processing path;
    b) supplying said video signal to a second processing path and, in said second processing path, applying gamma correction to at least a portion of the components of said video signal;
    c) in said first processing path, applying a controllably variable non-linear adjustment to said luminance signal to obtain an adjusted signal, the characteristic of said variable non-linear adjustment being different from the characteristic of said gamma correction, and then either blocking the low frequency components or enhancing the high frequency components of the adjusted signal to obtain a first processing path processed signal; and
    d) combining said non-linearly adjusted luminance signal with said gamma corrected video signal components to create a reduced-noise video signal.

2. A method according to claim 1, wherein the step of blocking the low frequency components or enhancing the high frequency components comprises applying aperture correction to said non-linearly adjusted luminance signal.

3. A method according to claim 1, wherein the form of said non-linear adjustment is chosen to provide the optimum noise reduction for the film type from which said video signal is obtained.

4. A method according to claim 1, wherein said luminance signal is formed from a multiplex of red, green and blue components of said video signal.

5. A method according to claim 1, wherein said characteristic of said non-linear adjustment is a power law curve with exposure.

6. A method according to claims 1, wherein said characteristic of said non-linear adjustment is a sinusoidal curve with exposure.

7. For a video signal produced by a telecine machine, a method of reducing noise in said video signal, comprising the steps of:
    a) deriving R (red), G (green) and B (blue) video signal components from said video signal;
    b) deriving a luminance signal from said R, G and B video signal components;
    c) applying gamma correction to at least a portion of said R, G and B video signal components;
    d) applying a controllably variable non-linear adjustment to said luminance signal to obtain an adjusted signal, the characteristic of said variable non-linear adjustment being different from the characteristic of said gamma correction components or enhancing the high frequency components of the adjusted signal to obtain a filtered non-linearly adjusted luminance signal; and
    e) combining said filtered non-linearly adjusted luminance signal with said gamma corrected R, G and B video components to create a reduced-noise video signal.

8. A method according to claim 7, wherein said derived R, G and B video signal components are each corrected for afterglow effects generated in said telecine machine.

9. For a video signal obtained from photographic film, a method of reducing noise in said video signal, comprising the steps of:
    (a) deriving a luminance signal from said video signal;
    (b) applying gamma correction to components of said video signal;
    (c) applying a controllably variable non-linear correction characteristic to said luminance signal;
    (d) applying an aperture correction to said non-linearly corrected luminance signal; and
    (e) combining said aperture corrected, non-linearly corrected luminance signal with said gamma correlated video signal components to create a reduced-noise video signal.

10. Apparatus for reducing noise in a video signal produced from photographic film, comprising:
    a video signal input to receive said video signal;
    means coupled to said input and operable to derive a luminance signal from said video signal;
    a gamma corrector coupled to said input and operable to apply a gamma correction to color components of said video signal;
    non-linear correction characteristic applying means coupled to said luminance signal deriving means and operable to apply a variable non-linear correction characteristic to said luminance signal to obtain an adjusted signal, said non-linear correction characteristic being different from said gamma correction; high pass filter means for either blocking low frequency components or enhancing the high frequency components of said adjusted signal to obtain a filtered non-linearly adjusted signal; and combining means coupled to said gamma corrector and said high pass filter means and operable to combine said filtered non-linearly corrected luminance signal with said gamma corrected video signal components to create a reduced-noise signal.

11. Apparatus according to claim 10, wherein said non-linear correction characteristic applying means applies a characteristic chosen to provide the optimum noise reduction for the film type from which said video signal is obtained.

12. Apparatus according to claim 10, wherein said non-linear correction characteristic applying means applies a power law gamma characteristic to said luminance signal.

13. Apparatus according to claim 10, wherein said non-linear correction characteristic applying means applies a sinusoidal correction curve.

14. Apparatus according to claim 10, wherein said luminance signal deriving means comprises a luminance matrix for multiplexing the color components of said video signal prior to application of said variable non-linear correction characteristic.

15. Apparatus according to claim 10, wherein said gamma corrector applies gamma correction to low frequency components of said video signal, and said non-linear characteristic applying means applies said variable non-linear correction characteristic to at least the high frequency components of said luminance signal.

16. A method of reducing noise in a video signal, comprising the steps of:

a) supplying at least one color component signal of said video signal or a luminance signal derived from said video signal to a first processing path and a second processing path, said second processing path including a low frequency band pass filter;

b) in said first processing path, applying a controllably variable non-linear adjustment to at least a portion of the frequency spectrum of said at least one color component signal or luminance signal to obtain an adjusted signal, said variable non-linear adjustment being under the control of an external control signal, and then either blocking the low frequency components or enhancing the high frequency components of the adjusted signal to obtain a first processing path processed signal;

c) in said second processing path, processing said video signal or at least one color component signal or luminance signal thereof; and d) adding said first processing path processed signal obtained from said first processing path to a processed signal obtained from said second processing path.

17. A method according to claim 16, wherein said low pass filter passes at least the lower 15% of bandwidth of said video signal.

18. A method of reducing noise in a video signal, comprising the steps of:

a) supplying at least one color component signal of said video signal or a luminance signal derived from said video signal to a first processing path and the color components of said video signal to a second processing path;

b) in said first processing path, applying a controllably variable non-linear adjustment to at least a portion of the frequency spectrum of said at least one color component signal or luminance signal to obtain an adjusted signal, said variable non-linear adjustment being under the control of an external control signal, and then either blocking the low frequency components or enhancing the high frequency components of the adjusted signal to obtain a first processing path processed signal;

c) in said second processing path, processing said color components of said video signal; and d) adding said first processing path processed signal obtained from said first processing path to respective processed signals obtained from processing said color components of said video signal in said second processing path.

19. A method according to claim 18, wherein said signal processed in said first signal path is a luminance signal and said signal added to each of said colour components processed in the second signal path is weighted in accordance with the colour processed by said second signal path.

20. Apparatus according to claim 10, wherein said high pass filter means comprises aperture corrector means coupled between said non-linear correction characteristic applying means and said combining means and operable to apply an aperture correction to said non-linearly corrected luminance signal.

\* \* \* \* \*